April 2, 1957  W. CALL  2,787,110
COTTON PICKING SPINDLE UNIT
Filed Feb. 20, 1956
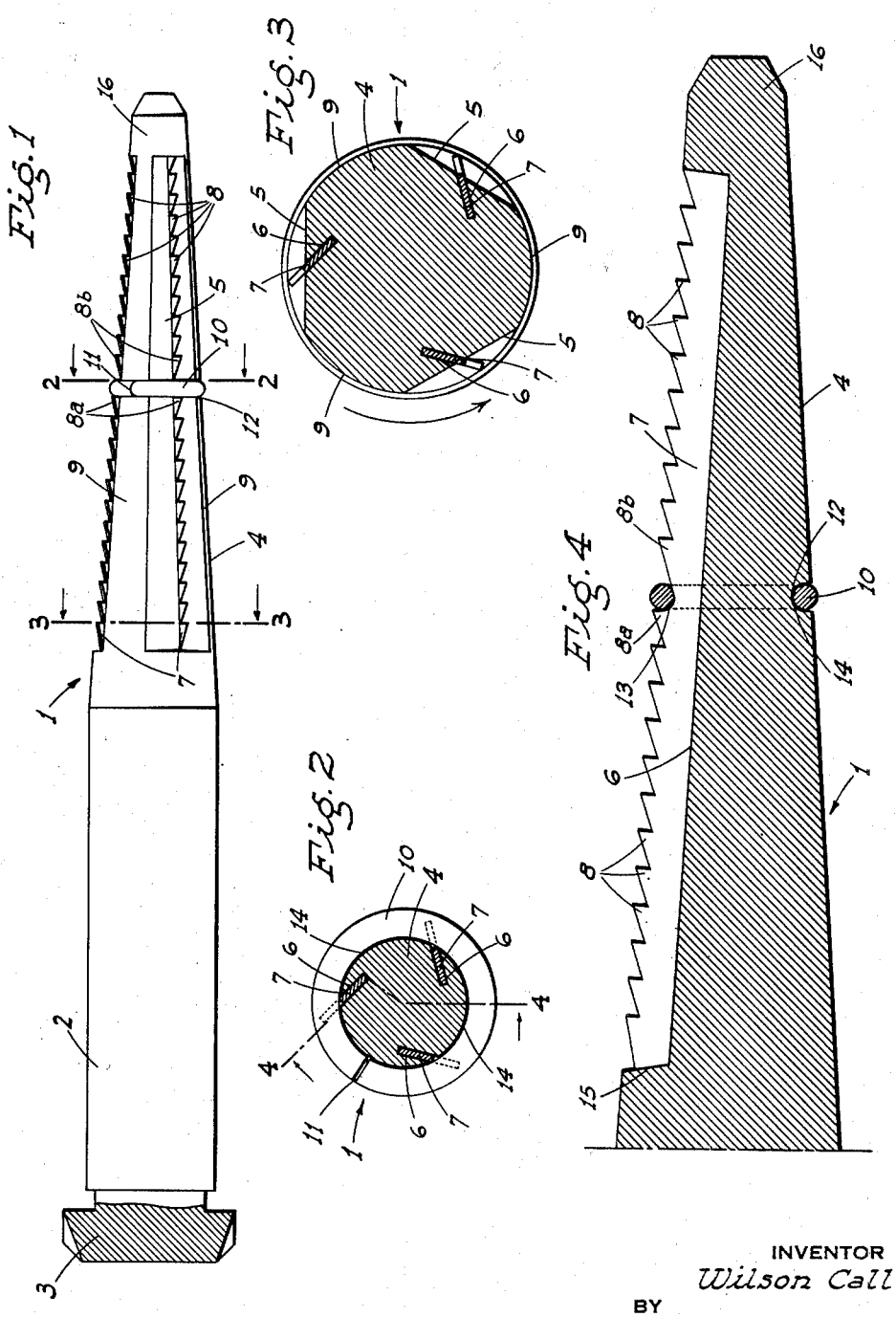
INVENTOR
Wilson Call
BY
ATTYS United States Patent Office 2,787,110
Patented Apr. 2, 1957

2,787,110
COTTON PICKING SPINDLE UNIT
Wilson Call, Bakersfield, Calif.
Application February 20, 1956, Serial No. 566,590
7 Claims. (Cl. 56—50)

This invention relates generally to cotton picking spindles as embodied in power driven cotton harvesting machines; such a machine being fitted with a multiplicity of such spindles.

At present it is the practice in the trade to entirely remove the spindles from the cotton harvesting machine for the purpose of sharpening the picking barbs thereon, or entirely replacing the spindles if such barbs are worn so that sharpening is not practical. In either event it is a time-consuming and costly operation.

It is therefore the major object of the present invention to provide a cotton picking spindle unit which includes initially separate picker-inserts in the form of toothed blades seated in circumferentially spaced longitudinal slots in the spindle, with the teeth projecting outwardly thereof to serve as the picking barbs; the blades being normally but removably secured—by novel means—in such slots.

With such an arrangement the blades, when the teeth or barbs are worn, can be readily removed for sharpening or replacement without the necessity of dismantling the supporting structure and removing such spindles; all to the end that a relatively great economy is effected.

Another important object of this invention is to provide a cotton picking spindle unit, with replaceable blades, as above, in which the blade securing means includes a spring metal or snap ring associated with the spindle and blades in novel assembly.

It is also an object of the invention to provide a cotton picking spindle unit which is designed for ease and economy of manufacture, and convenience of replacement of the toothed blades.

Still another object of the invention is to provide a practical, reliable, and durable cotton picker spindle, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of one of the cotton picking spindle units.

Fig. 2 is an enlarged transverse section on line 2—2 of Fig. 1.

Fig. 3 is an enlarged transverse section on line 3—3 of Fig. 1.

Fig. 4 is an enlarged longitudinal sectional elevation of the forwardly tapered outer portion of the spindle showing one of the toothed blades as secured in the related slot by the snap ring, taken on line 4—4 of Fig. 2.

Referring now more particularly to the drawings, and to the characters of reference marked thereon, the novel cotton picking spindle unit comprises a spindle, indicated generally at 1; such spindle having an inner cylindrical or journal portion 2 of constant diameter. At the rear end of said inner or journal portion 2 the same is formed with a drive gear 3, as usual.

Ahead of the inner or journal portion 2 of the spindle it includes, in integral relation, a forwardly tapered outer portion 4 which is generally circular as a whole, but is formed with a plurality of circumferentially spaced, longitudinal, flat faces 5. The longitudinal, flat faces 5 terminate adjacent, but short of, the ends of the outer portion 4 of the spindle 1.

Longitudinal slots 6 are milled in the outer portion 4 of the spindle and open to said faces 5 substantially centrally of the sides thereof; said slots 6 extending full length of the faces 5, and being inclined or angled transversely, as shown.

A picker-insert in the form of a flat, toothed blade 7 is seated in—and extends the full length of—each slot 6; such blades being dimensioned from bottom to top so that the teeth 8 of said blades project above the faces 5; the length of the teeth being such that they do not extend beyond the related peripheral plane of the outer portion 4 of the spindle.

In other words, the extremities of the teeth 8 travel in a circular path, upon rotation of the spindle 1, which is of no greater diameter than the circular path defined by the lands 9 of the outer portion 4 between the slots 6. This is of importance for the reason as will hereinafter appear.

Additionally, by reason of the transverse angle of the slots 6, the projecting teeth 8 of each blade 7 lean or cant in the direction of rotation of the spindle, whereby to accomplish a more effective cotton picking action when in use.

The teeth 8 of the blades 7 face toward the front end of the outer portion 4 of the spindle, and said blades 7 are normally but removably secured in the slots 6 in the following manner:

A spring metal or snap ring 10, split through transversely at one point, as at 11, encircles the assembly of the outer portion 4 and the blades 7 seated in the slots 6; the ring—when in place—being disposed in a circumferential groove 12 in the outer portion of the spindle substantially centrally of its ends. When the snap ring 10 is disposed in the circumferential groove 12, the outer edge grips the blades 7 very tightly and at a point between adjacent teeth, indicated at 8a and 8b (see Fig. 4). As so gripped by the snap ring 10 the toothed blades 7 cannot accidentally displace from the slots 6 when the spindle is rotating.

In order to assure of proper engagement of the snap ring 10 with the outer edge of the blades 7, the latter include rounded seats 13 between said adjacent teeth 8a and 8b. It is also to be noted that the blade holding action of the snap ring 10 is enhanced by reason of the fact that said snap ring, while disposed in the circumferential groove 12, does not fully seat therein; i. e., a small clearance, as at 14, exists between the inside of said snap ring and the bottom of such groove.

The snap ring 10 is initially brought to position, as above, and after the blades 7 have been inserted in the slots, by merely sliding such ring rearwardly on the outer portion 4 of the spindle from its front end; such ring riding on the lands 9 as it moves rearwardly, and then finally snap-engages into the groove 12 and against the rounded seats 13 of said blades 7. Such placement of the snap ring 10 on the outer portion 4 of the spindle is not hindered by the teeth 8, for the reason that the latter—as hereinbefore described—do not project beyond the rotative path or peripheral plane of the lands 9, and on which lands the snap ring is moved toward, and for snap-engagement in, the circumferential groove 12.

When it is desired to remove the blades 7 for resharpening of the teeth 8, or entire replacement of said blades, the snap ring 10 is either sprung open or cut apart and removed. Thereafter, the blades 7 can be readily withdrawn from the slots 6 with the spindles 1 remaining in place on the machine. In order to assure that the blades do not bind in the slots 6, at least one end of each thereof (here the rear end 15) is cut at an outward and rearward incline, with the related end of the blade correspondingly or matchingly angled.

As the slots 6 terminate short of the front end of the outer portion 4 of the spindle, with the result that the toothed blades 7 likewise terminate short of said end, the latter remains as a solid nose 16, which is advantageous in order to prevent what is known as "pigtailing" when the spindle 1 is rotating in use.

With the described cotton picking unit, the spindles can be maintained with the teeth 8—and which form the cotton picking barb—in a sharp condition, with a minimum of time and effort being required to remove and sharpen or replace the blades 7, and without the necessity of detaching the spindles from the machine.

Another advantage of the detachable blades 7 resides in the fact that they can be made of a special hardened or tempered steel, and which may not be the type of metal best suited for the spindle itself.

From the foregoing description it will be seen that there has been produced such a device as will fully fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cotton picking spindle unit comprising a spindle having a forwardly tapering outer portion, and having a plurality of circumferentially spaced slots in said outer portion of the spindle, initially separate toothed blades disposed in the slots with the teeth projecting outwardly thereof, and a snap-ring encircling said outer portion of the spindle in outer edge engagement with the blades intermediate the ends thereof whereby to removably secure the latter in the slots.

2. A cotton picking spindle unit comprising a spindle having a forwardly tapering outer portion, and having a plurality of circumferentially spaced slots in said outer portion of the spindle, initially separate toothed blades disposed in the slots with the teeth projecting outwardly thereof, and a snap-ring encircling said outer portion of the spindle in outer edge engagement with the blades intermediate the ends thereof whereby to removably secure the latter in the slots; said outer portion of the spindle having a circumferential groove therein, and the snap-ring being disposed in said groove.

3. A cotton picking spindle unit, as in claim 2, in which the snap-ring clears the bottom of said groove when in such outer edge engagement with the blades.

4. A cotton picking spindle unit, as in claim 2, in which the snap-ring edge engages the blades between adjacent teeth thereof; each blade having a seat, for said ring, formed between said adjacent teeth.

5. A cotton picking spindle unit comprising a spindle having a forwardly tapering outer portion, there being a plurality of circumferentially spaced longitudinally extending flat faces on said outer portion defining lands between the faces and the latter having circumferentially spaced longitudinal slots therein each opening through a corresponding face intermediate the sides thereof, toothed blades disposed in the slots with the teeth projecting outwardly of said faces, and a snap-ring encircling the outer portion of the spindle in outer edge engagement with the blades intermediate their ends whereby to removably secure said blades in the slots; said lands of the spindle having a circumferential groove therein, and the snap-ring being disposed in the groove; the groove diameter at the bottom and the internal diameter of the ring being so related that the ring clears the bottom of said groove when in such outer edge engagement with the blades.

6. A cotton picking spindle unit comprising a spindle having a forwardly tapering outer portion, there being a plurality of circumferentially spaced longitudinally extending flat faces on said outer portion and the latter having circumferentially spaced longitudinal slots therein each opening through a corresponding face intermediate the sides thereof, toothed blades disposed in the slots with the teeth projecting outwardly of said faces, and a snap-ring encircling the outer portion of the spindle in outer edge engagement with the blades intermediate their ends whereby to removably secure said blades in the slots; said outer portion of the spindle having a circumferential groove therein, the snap-ring being disposed in the groove, and the teeth forwardly of the groove having outer terminations within the peripheral plane of the corresponding part of said outer portion so that the snap-ring is slidable thereon to reach the groove without obstruction by said teeth.

7. A cotton picking spindle unit comprising a spindle having a forwardly tapering outer portion, there being a plurality of circumferentially spaced longitudinally extending flat faces on said outer portion and the latter having circumferentially spaced longitudinal slots therein each opening through a corresponding face intermediate the sides thereof, toothed blades disposed in the slots with the teeth projecting outwardly of said faces, said outer portion of the spindle having longitudinal lands between said faces, the teeth having outer end termination within the peripheral plane of said lands, said outer portion of the spindle having a circumferential groove intermediate the ends of and extending through the lands, and a snap-ring encircling said outer portion of the spindle in outer edge engagement with the blades and disposed in the groove between said blades whereby to secure the latter in the slots.

References Cited in the file of this patent
UNITED STATES PATENTS

| | | |
|---|---|---|
| 931,926 | Houghton | Aug. 24, 1909 |
| 2,504,723 | Paradise | Apr. 18, 1950 |
| 2,508,842 | Searles | May 23, 1950 |
| 2,645,892 | Weems | July 21, 1953 |
| 2,667,725 | Voigt | Feb. 2, 1954 |
| 2,667,726 | Vogel | Feb. 2, 1954 |